United States Patent [19]

Nicolai

[11] 4,403,323
[45] Sep. 6, 1983

[54] OPTICAL TRANSISTOR

[76] Inventor: Van O. Nicolai, 206 Apple Blossom Ct., Vienna, Va. 22180

[21] Appl. No.: 212,174

[22] Filed: Dec. 2, 1980

[51] Int. Cl.³ .............................................. H01S 3/17
[52] U.S. Cl. ...................................... 372/40; 372/69; 372/68
[58] Field of Search ...................... 372/7, 70, 71, 8, 41, 372/43, 40, 69, 68

[56] References Cited

U.S. PATENT DOCUMENTS

| | | | |
|---|---|---|---|
| 4,038,610 | 7/1977 | Nishizawa et al. | 331/94.5 H |
| 4,132,962 | 1/1979 | Yang et al. | 331/94.5 H |
| 4,321,559 | 3/1982 | Esterowitz | 372/41 |

OTHER PUBLICATIONS

Chivian et al., "The Photon Avalanche: A New Phenomenon in $Pr^{3+}$-Based Infrared Quantum Counters," Appl. Phys. Lett. 35(2) 15 Jul. 1979, pp. 124-125.
Esterowitz et al., Appl. Phys. Lett., vol. 35, No. 3 (Aug. 1, 1979) pp. 236-239, Long-Wavelength Stimulated Emission via Cascade Laser Action in HO:YLF.
1979 IEEE/OSA Conference on Laser Engineering and Applications, May 30-Jun. 1, 1979 by Erlich et al.

Primary Examiner—William L. Sikes
Assistant Examiner—Léon Scott, Jr.
Attorney, Agent, or Firm—R. F. Beers; Sol Sheinbein; J. G. Wynn

[57] ABSTRACT

A device which uses a light signal to control the amplification of light is disclosed. Optically active ions in a laser material are pumped to an intermediate energy state by light of a first frequency, and thereafter pumped from the intermediate energy state to an upper energy state by light of a second frequency. Lasing occurs when the optically active ions fall back to the intermediate energy state. When the intensity of the light of the first frequency is below the threshold pumping level, no laser action can occur even though the intensity of the light of the second frequency is above its threshold pumping level. Thus a large output power can be controlled by a small input power.

3 Claims, 2 Drawing Figures

OPTICAL TRANSISTOR

BACKGROUND OF THE INVENTION

The present invention relates generally to lasers and more particularly to a laser device using a light signal to control the amplification of light.

The desirability of systems performing detection and communication functions with light waves has previously been recognized. In the field of electronics, transistor devices are known wherein a small power electrical signal is used to control the amplification of a second electrical signal to give a higher electrical output power. It is desirable to provide for an analogous device wherein a small power optical signal can be used to control the amplification of a second optical signal to give a higher optical output power. Such a device is needed for the development of integrated circuitry for operation at optical frequencies.

OBJECTS OF THE INVENTION

It is an object of the present invention to provide a laser device using a light signal to control the amplification of light.

It is another object of the present invention to provide an improved laser device wherein a large output light power can be controlled by a small input light power.

SUMMARY OF THE INVENTION

The objects of the present invention are achieved by an optical transistor which includes a material constituting a host single crystal containing optically active ions with a lower energy state, an intermediate energy state and an upper energy state. The pumping of energy into the crystal to effect stimulated emission is provided by a first pumping means which acts to populate the intermediate energy state with optically active ions from the lower state; and by a second pumping means which is responsive to an increase in population of the optically active ions in the intermediate energy state for effecting an inverted population state of the optically active ions between the intermediate energy state and the upper energy state. Regeneration means are provided to enhance the stimulated emission of coherent light from the crystal at a wavelength corresponding to an energy difference between the upper energy state and the intermediate energy state. When the intensity of the light pulse provided by the first pumping means is below its threshold pumping level, no laser action can occur even though the intensity of the light pulse provided by the second pumping means is above its threshold pumping level. Thus, the laser action is controlled by the intensity of the light pulse supplied by the first pumping means. The device is the optical analogue of the electronic transistor in that a large output light power can be controlled by a small input power.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1:
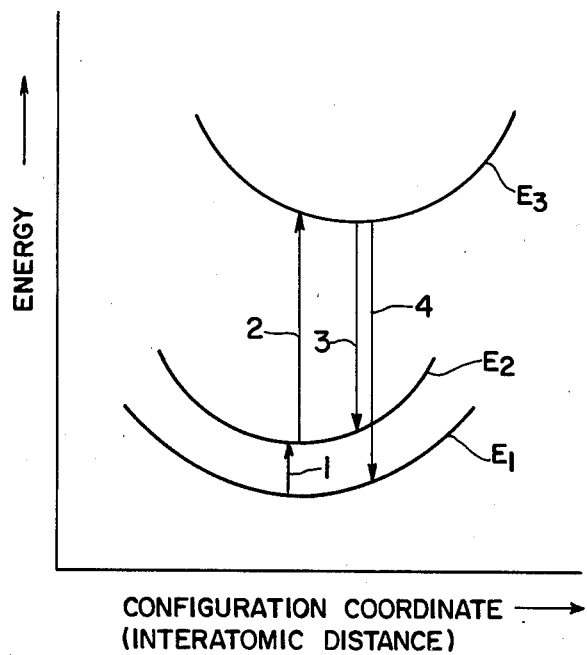
FIG. 1 is a generalized energy level diagram indicating the transitions which occur to produce laser action in the optical transistor of the invention.

Referring now to the drawings and more particularly to FIG. 1 thereof, the principle of operation of the optical transistor of the present invention will be explained. FIG. 1 is a diagram illustrating the energy states within a laser material, as well as the various transitions which occur to produce the laser action. FIG. 1 portrays a three level system. Three different energy states for the optically active ions present in the laser material are shown, specifically a lower state $E_1$, an intermediate metastable state $E_2$, and an upper state $E_3$. When the laser material is quiescent, that is in the absence of pumping radiation, all of the optically active ions are in the lower state $E_1$. Absorption of a first pumping light pulse of frequency $f_1$ raises ions from the lower state $E_1$ to the intermediate state $E_2$ (as depicted by arrow 1). Absorption of a second pumping light pulse of frequency $f_2$ raises these ions from the intermediate state $E_2$ to the upper state $E_3$ (as depicted by arrow 2). If ions are excited from $E_2$ to $E_3$ at a rate faster than the rate at which they fall back to $E_2$ by spontaneous emission, the population of state $E_3$ becomes larger than that of state $E_2$, that is, population inversion is achieved and stimulated emission from the upper state $E_3$ to the intermediate state $E_2$ occurs with a resulting laser output at frequency $f_3$ (as depicted by arrow 3). Once the stimulated emission begins, the upper state $E_3$ is depopulated very quickly. However, if the intensity of the second pumping light pulse remains above the threshold pumping level, the ions that have fallen back to $E_2$ are raised again to $E_3$ (as depicted by arrow 2), population inversion builds up again and a second laser output occurs (as depicted by arrow 3). Since the lifetime of a metastable state $E_2$ exceeds that of $E_3$, the process depicted by arrows 2 and 3 can be repeated many times. The laser emissions end when the ions are raised to the upper state $E_3$ (as depicted by arrow 2) and $E_3$ is then depopulated by spontaneous emission to the lower state $E_1$ (as depicted by arrow 4). The number of laser outputs occurring is determined by the ratio of the spontaneous emission coefficients for the competing transitions $E_3$ to $E_2$ and $E_3$ to $E_1$ respectively. If this ratio is represented by the number n, then at least n laser outputs will occur before the laser material returns to its quiescent state. Since the laser output of frequency $f_3$ cannot be obtained until the pulse of frequency $f_1$ is supplied, the system acts like a transistor with a large $f_3$ output power controlled by a small $f_1$ input power.

It is to be understood that FIG. 1 is a generalized energy diagram so that the exact positions of the energy levels of the ions will vary with the particular ion in question and the hose material.

Illustratively, the host material can be $ThO_2$ and the ion can be $Ce^{+3}$ both of which can be fabricated by well known top seeded growth techniques for which the 5d–4f fluorescence lies in the visible region of the spectrum. The $(4f)^1$ ground state of trivalent cerium is split into $^2F_{5/2}$ and $^2F_{7/2}$ manifolds with the latter unoccupied at room temperature. In contrast to these well shielded 4f states, the 5d levels are extremely host-sensitive and form a 5d energy band. Thus, in spectroscopic notation, the levels $E_1$, $E_2$ and $E_3$ for $Ce^{+3}$ in $ThO_2$ are respectively $^2F_{5/2}$, $^2F_{7/2}$, and 5d. The energy separation indicated by arrow 1 is 2000 $cm^{-1}$, and that indicated by arrow 3 is 23,000 $cm^{-1}$. The radiative lifetime of intermediate state $E_2$ is 1 msec., that of upper state $E_3$ is 50 nsec. The ratio of the spontaneous emission coefficients for the competing transitions $E_3$ to $E_2$ (as depicted by arrow 3) and $E_3$ to $E_1$ (as depicited by arrow 4) is 20. When cooled to liquid nitrogen temperature, CW laser pump radiation at frequency $f_2$ will cause transition $E_2$ to $E_3$ (as depicted by arrow 2) but not transitions $E_1$ to $E_3$.

Figure 2:
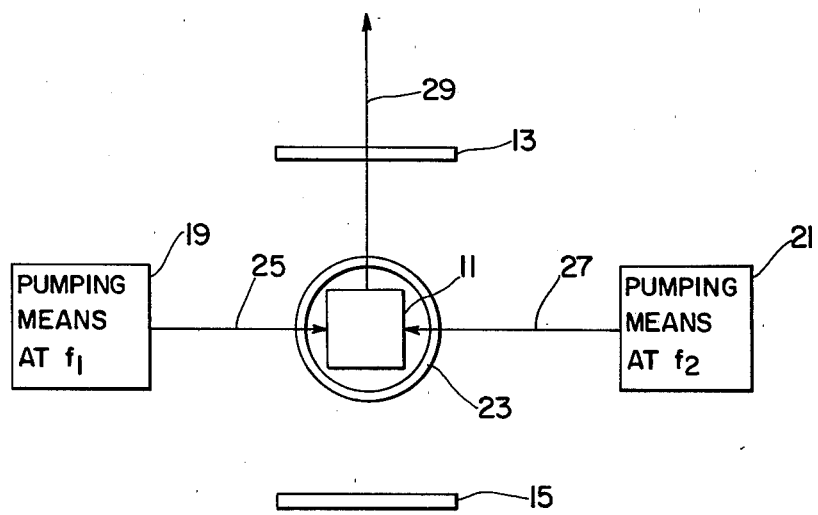
FIG. 2 is a schematic diagram showing the basic components of the optical transistor of the invention.

Referring again to Figure, and to FIG. 2 as viewed concurrently, there is illustrated an embodiment of the optical transistor utilizing a laser material as described above. The device includes a laser material constituting a single crystal 11 containing optically active ions having the characteristics of a lower energy state $E_1$, an intermediate energy state $E_2$, and an upper energy state $E_3$. A dewar 23 is positioned about the crystal 11 for support and temperature control thereof.

Laser crystal 11 is disposed between regeneration means to form a resonant laser cavity. While a variety of regeneration means for enhancing the stimulated emission of coherent light from the crystal can be provided, such means may take the form illustrated in FIG. 2 of reflectors 13 and 15 which exhibit reflectance at a wavelength corresponding to the laser transition indicated by arrow 3 in FIG. 1. Reflector 13 is partially reflecting to permit the escape of coherent radiation, whereas reflector 15 is highly reflective. Pumping energy for populating the intermediate energy state $E_2$ with optically active ions from the lower energy state $E_1$ is supplied to the crystal by first pumping means 19. Pumping energy for effecting an inverted population state of the optically active ions between the intermediate energy state $E_2$ and the upper state $E_3$ is supplied to the crystal 11 by second pumping means 21. While the two pumping means may conveniently take a variety of forms, they may take the form of dye lasers, the first pumping means being operated at a frequency $f_1$ corresponding to the energy difference indicated by arrow 1 in FIG. 1, and the second pumping means being operated at a frequency $f_2$ corresponding to the energy difference indicated by arrow 2 in FIG. 1.

As described with respect to FIG. 2, upon application of sufficient pumping light to the crystal 11 from the two pumping means 19 and 21 as depicted by arrows 25 and 27, an optical pumping transfer and a laser transition occurs within the crystal. An output of monochromatic radiation, corresponding to the laser output of frequency $f_3$ as previously mentioned, is produced and passes through partially reflecting reflector 13 as depicted by arrow 29. When the intensity of the light pulse supplied by the first pumping means 19 is below its threshold pumping level, no laser action can occur, even though the intensity of the light pulse supplied by the second pumping means 21 is above its threshold pumping level. Thus, the laser action is controlled by the intensity of the light pulse supplied by the first pumping means 19.

The optical transistor can be operated as a light amplifier or as a light oscillator depending upon whether the product of the effective internal reflectivity and the gain of the laser resonant cavity is less than or equal to unity.

Therefore, there has been provided a novel optical transistor wherein a large output power can be controlled by a small input light power.

Obviously, many modifications and variations of the present invention are possible in light of the above teachings. It is therefore to be understood that within the scope of the appended claims the invention can be practiced otherwise than as specifically described.

What is claimed is:

1. An optical transistor wherein a large output light power is controlled by a smaller input light power comprising:

a lasing material constituting a host single crystal disposed in a resonant laser cavity, said host single crystal being doped with optically active ions so as to have the characteristics of a lower energy state $E_1$, an intermediate energy state $E_2$, and an upper energy state $E_3$, said host single crystal containing said optically active ions being capable of omitting optical radiation;

first pumping means disposed on a first axis adjacent to said host crystal and being optically coupled thereto so as to provide a light pulse of frequency $f_1$ thereto for raising said optically active ions from the lower energy state $E_1$ to the intermediate energy state $E_2$, wherein the light pulses of frequency $f_1$ correspond to the energy difference between the lower energy state $E_1$ and the intermediate energy state $E_2$;

second pumping means disposed on the first axis adjacent to said host single crystal so that it is disposed between said first and second pumping means on the first axis, said second pumping means being optically coupled to said host single crystal so as to provide a light pulse of frequency $f_2$ thereto for raising said optically active ions from the intermediate energy state $E_2$ to the upper energy state $E_3$, wherein the light pulses of frequency $f_2$ correspond to the energy difference between the intermediate energy state $E_2$ and the upper energy state $E_3$; and regeneration means configured to form the resonant laser cavity for said host single crystal, said regeneration means including first and second reflectors disposed opposite each other on a second axis orthogonal to the first axis with said host single crystal disposed therebetween on the second axis at the intersection of the first axis, said first and second reflectors exhibiting reflectance at a laser output of frequency $f_3$ which corresponds to the energy difference between the upper energy state $E_1$ and the intermediate energy state $E_2$ so as to enhance the stimulated emission of light from said host single crystal, said first reflector being partially reflecting so as to pass the light from said host single crystal in the form of a coherent light beam and said second reflector being highly reflective.

2. The optical transistor of claim 1 wherein said host single crystal comprises a lasing material of $ThO_2$, and wherein said optically active ions comprise $Ce^{+3}$.

3. The optical transistor of claim 2 further comprising means positioned about said host single crystal for support and temperature control thereof.

* * * * *